(12) United States Patent
Kim et al.

(10) Patent No.: US 11,410,584 B2
(45) Date of Patent: Aug. 9, 2022

(54) ELECTRONIC DEVICE INCLUDING DISPLAY HAVING VARIABLE SCREEN SIZE AND METHOD FOR COMPENSATING DEGRADATION OF THE DISPLAY

(71) Applicant: Samsung Electronics Co., Ltd., Gyeonggi-do (KR)

(72) Inventors: Youngrog Kim, Gyeonggi-do (KR); Jookwan Lee, Gyeonggi-do (KR); Junwoo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/473,480

(22) Filed: Sep. 13, 2021

(65) Prior Publication Data

US 2022/0122501 A1    Apr. 21, 2022

Related U.S. Application Data

(63) Continuation of application No. 17/324,844, filed on May 19, 2021, now Pat. No. 11,151,917.

(30) Foreign Application Priority Data

Oct. 15, 2020 (KR) .......................... 10-2020-0133131

(51) Int. Cl.
*G09G 3/20* (2006.01)
*G09G 3/36* (2006.01)
*G09G 3/00* (2006.01)

(52) U.S. Cl.
CPC ....... *G09G 3/035* (2020.08); *G09G 2320/045* (2013.01); *G09G 2340/0442* (2013.01); *G09G 2380/02* (2013.01)

(58) Field of Classification Search
CPC ................................................. G09G 2360/16
See application file for complete search history.

(56) References Cited

U.S. PATENT DOCUMENTS

2008/0309602 A1* 12/2008 Hwang ................. G09G 3/006
                                                                        345/98
2018/0018929 A1*  1/2018 Xun ...................... G06F 1/1626
(Continued)

FOREIGN PATENT DOCUMENTS

KR    10-2013-0018493      2/2013
KR    10-2019-0077846      7/2019
(Continued)

OTHER PUBLICATIONS

International Search Report dated Jul. 16, 2021 issued in counterpart application No. PCT/KR2021/005274, 8 pages.

*Primary Examiner* — Nan-Ying Yang
(74) *Attorney, Agent, or Firm* — The Farrell Law Firm, P.C.

(57) ABSTRACT

Disclosed is an electronic device including a display including a first part where a size viewed from an outside is constant and a second part where an area viewed from the outside is variable, a display driver integrated circuit (IC) configured to control the display, a memory, and a processor operatively connected with the display driver IC and the memory, wherein the processor is configured to, based on the area of the second part viewed from the outside, define a plurality of virtual regions including a first region and a second region adjacent to each other, based on an accumulated value of red, green, blue (RGB) values applied to each frame displayed on a screen, acquire color information of each of the plurality of virtual regions, based on an accumulated use time for each of the plurality of virtual regions and the color information, calculate a plurality of total accumulated values of each of the plurality of virtual regions, set a boundary, which is positioned between the first region and the second region, as a degradation boundary, when a difference value between a first total accumulated value of the first region and a second total accumulated value (Continued)

of the second region is greater than or equal to a threshold value, and transmit degradation data including the degradation boundary to the display driver IC.

20 Claims, 13 Drawing Sheets

(56) References Cited

U.S. PATENT DOCUMENTS

2020/0265779 A1  8/2020  In
2021/0012751 A1  1/2021  An et al.

FOREIGN PATENT DOCUMENTS

| KR | 10-2019-0110318 | 9/2019 |
| KR | 10-2020-0063506 | 6/2020 |
| KR | 10-2020-0102032 | 8/2020 |
| KR | 10-2020-0111519 | 9/2020 |

\* cited by examiner

ELECTRONIC DEVICE INCLUDING DISPLAY HAVING VARIABLE SCREEN SIZE AND METHOD FOR COMPENSATING DEGRADATION OF THE DISPLAY

CROSS-REFERENCE TO RELATED APPLICATION(S)

This application is a Continuation application of U.S. patent application Ser. No. 17/324,844, filed on May 19, 2021, and is based on and claims priority under 35 U.S.C. § 119 to Korean Patent Application No. 10-2020-0133131, filed on Oct. 15, 2020, in the Korean Intellectual Property Office, the disclosure of which is incorporated by reference herein in its entirety.

BACKGROUND

1. Field

The disclosure relates generally to an electronic device, and more particularly, to an electronic device including a display having a variable screen size and a method for compensating for degradation of a display.

2. Description of Related Art

An electronic device may include a display which displays a screen. When the display displays the screen for a long period of time, degradation, such as a burn-in phenomenon, tends to occur. A processor may compensate for the degradation of the display through a set algorithm, according to which, a display having a constant screen size may be partitioned into a plurality of virtual regions, based on a set degradation boundary. The degradation may be compensated with respect to each partitioned virtual region.

Another display of an electronic device may be a type having a variable-sized screen. For example, the electronic device may include a display which has a screen that increases or decreases in size, similarly to a slidable and/or rollable display. The display having the variable screen size may include a first part viewed in a constant size from the outside, and a second part viewed in a variable size from the outside.

The second part may be dynamically inserted into the electronic device while the electronic device is being used and may be visibly exposed to the outside. A plurality of virtual regions included in the second part may be used at mutually different times. The plurality of virtual regions may be degraded at mutually different degrees. A degradation boundary may not be easily set in the display having the variable screen size. Accordingly, the degradation boundary may not be easily compensated in the display having the variable screen size.

Thus, there is a need in the art for an electronic device and method that mitigates such display degradation in the electronic device.

SUMMARY

Aspects of the disclosure are to address at least the above-mentioned problems and/or disadvantages and to provide at least the advantages described below. Accordingly, an aspect of the disclosure is to provide a method for compensating for the degradation of a display having a variable size by setting a degradation boundary in the display, and an electronic device employing the method.

In accordance with an aspect of the disclosure, an electronic device may include a display including a first part where a size viewed from an outside is constant and a second part where an area viewed from the outside is variable, a display driver integrated circuit (IC) configured to control the display, a memory, and a processor operatively connected with the display driver IC and the memory, wherein the processor is configured to, based on the area of the second part viewed from the outside, define a plurality of virtual regions including a first region and a second region adjacent to each other, based on an accumulated value of red, green, blue (RGB) values applied to each frame displayed on a screen, acquire color information of each of the plurality of virtual regions, based on an accumulated use time for each of the plurality of virtual regions and the color information, calculate a plurality of total accumulated values of each of the plurality of virtual regions, set a boundary, which is positioned between the first region and the second region, as a degradation boundary, when a difference value between a first total accumulated value of the first region and a second total accumulated value of the second region is greater than or equal to a threshold value, and transmit degradation data including the degradation boundary to the display driver IC.

In accordance with another aspect of the disclosure, a method for compensating for degradation of a display of an electronic device, the display including a first part where a size viewed from an outside is constant and a second part where an area viewed from the outside is variable, includes, based on the area of the second part viewed from the outside, defining a plurality of virtual regions including a first region and a second region adjacent to each other, based on an accumulated value of RGB values applied to each frame displayed on a screen, acquiring color information of each of the plurality of virtual regions, based on an accumulated use time for each of the plurality of virtual regions and the color information, calculating a plurality of total accumulated values of each of the plurality of virtual regions, setting, as a degradation boundary, a boundary, which is positioned between the first region and the second region, when a difference value between a first total accumulated value of the first region and a second total accumulated value of the second region is greater than or equal to a threshold value, and compensating for the degradation of the display based on degradation data including the degradation boundary.

In accordance with another aspect of the disclosure, an electronic device includes a display including a first part where a size viewed from an outside is constant and a second part where an area viewed from the outside is variable, a sensor configured to detect a change of the area of the second part, a display driver IC configured to control the display, a memory, and a processor operatively connected with the display driver IC and the memory, wherein the processor is configured to divide the second part into a plurality of virtual regions, when the sensor detects the change of the area of the second part, based on an accumulated value of RGB values applied to each frame displayed on a screen, acquire color information of each of the plurality of virtual regions, based on an accumulated use time for each of the plurality of regions and the color information, calculate a plurality of total accumulated values of each of the plurality of virtual regions, set, as a degradation boundary, a boundary between two adjacent regions of the plurality of virtual regions, when a difference value between total accumulated values of the two adjacent regions is greater than or equal to a threshold value, and transmit degradation data, which includes the degradation boundary, to a display information processing module of a kernel connected with the display driver IC.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Figure 1:
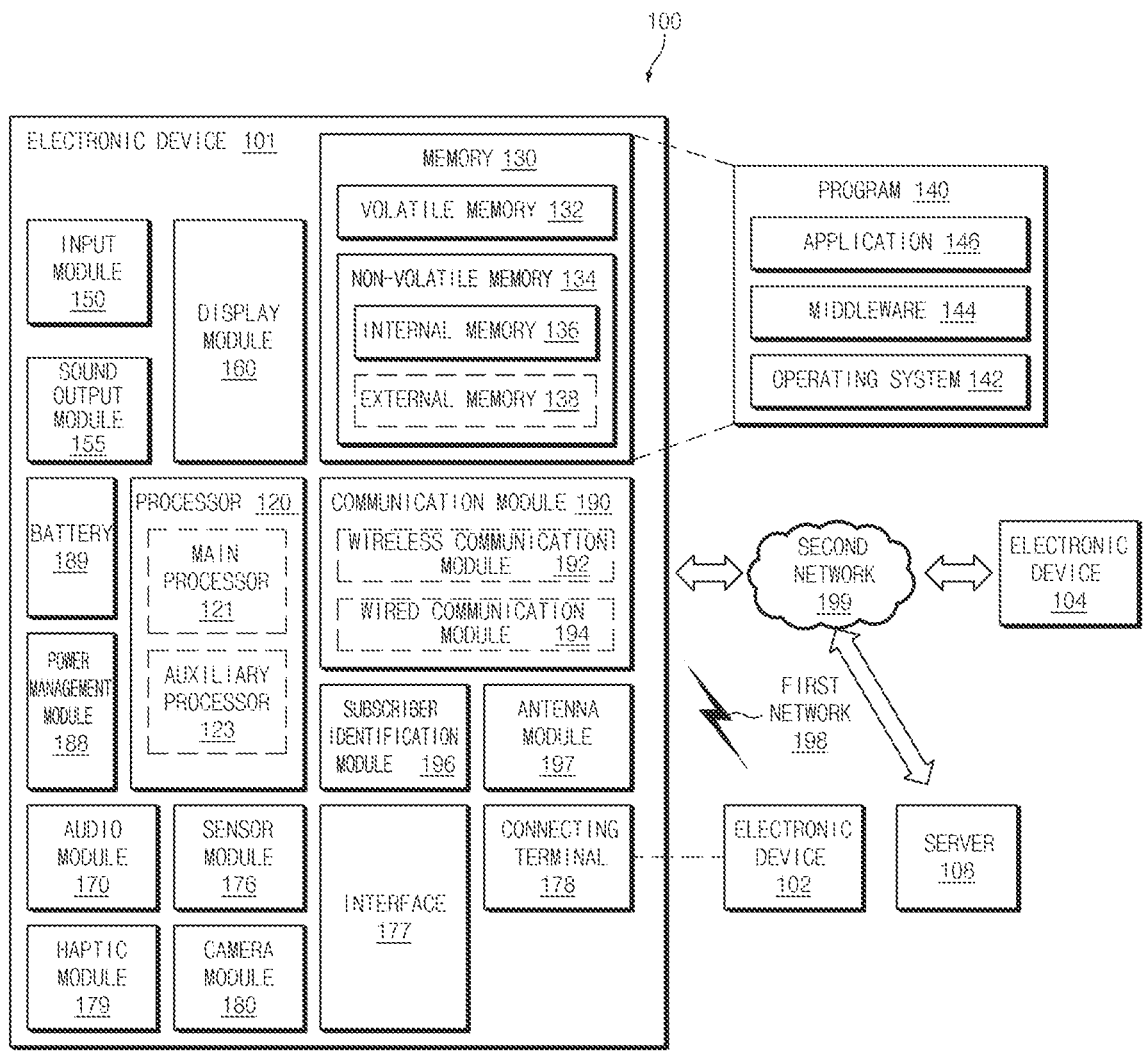
FIG. 1 is a block diagram illustrating an electronic device in a network environment according to an embodiment.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein may be variously made without departing from the scope and spirit of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
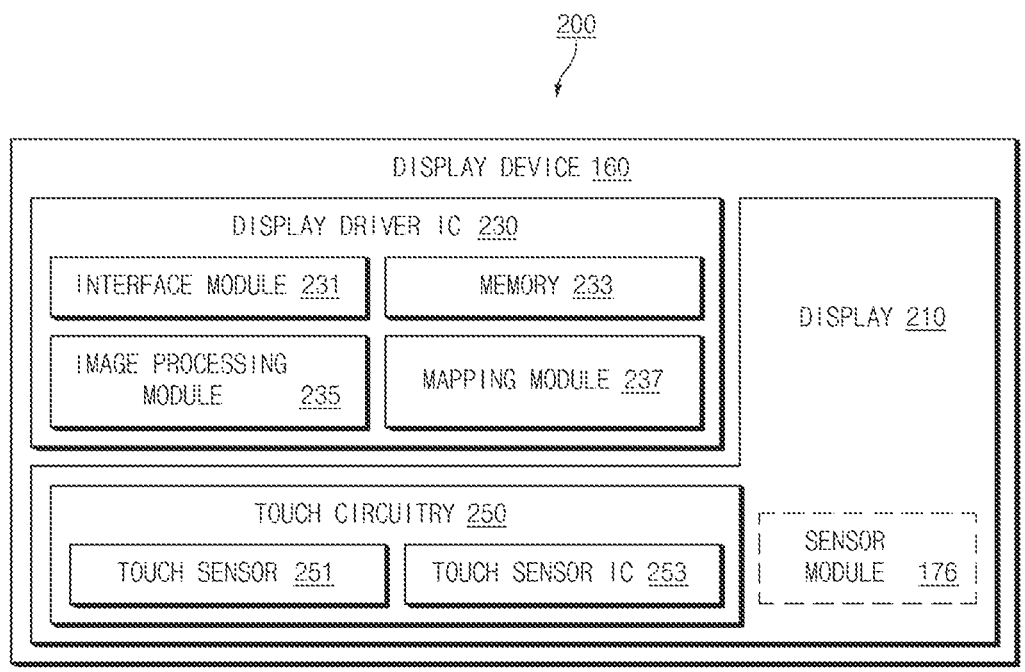
FIG. 2 is a block diagram illustrating the display device according to an embodiment.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as a red green blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
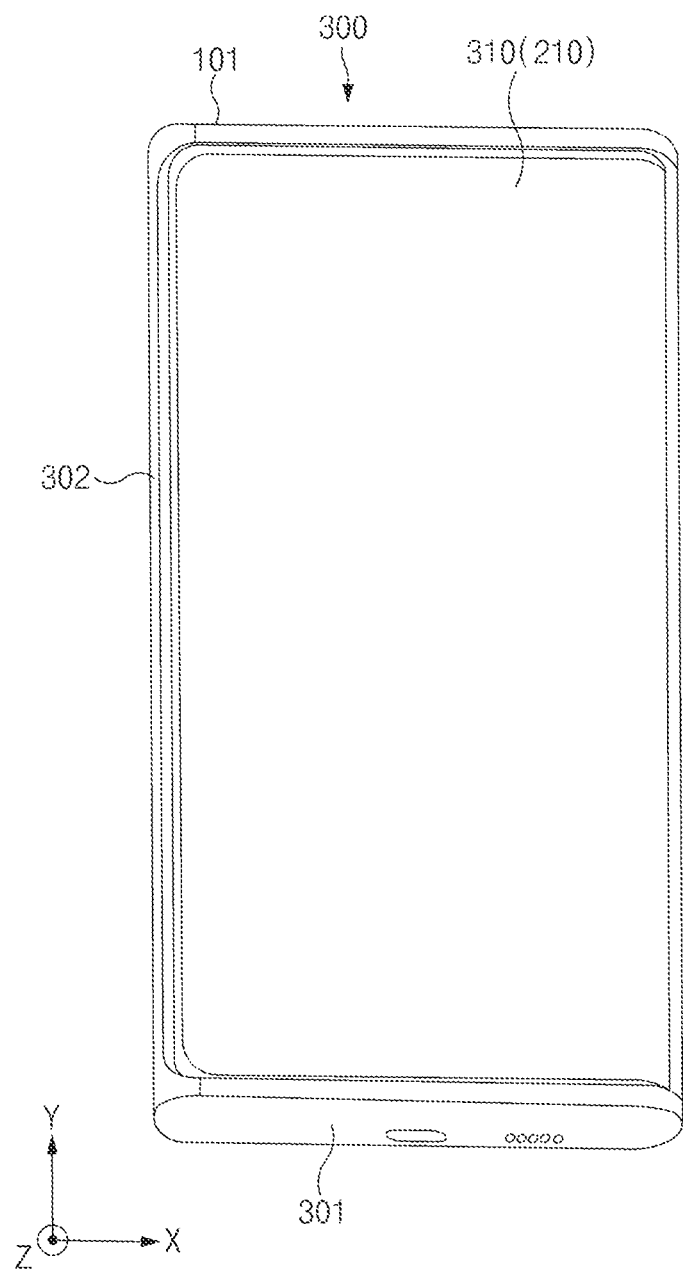
FIG. 3 is a front view illustrating a normal mode of a display of an electronic device, according to an embodiment.

FIG. 3 is a front view 300 illustrating a normal mode of the display 210 of the electronic device 101, according to an embodiment. The electronic device 101 illustrated in FIG. 3 may be a slidable electronic device 101 which moves the display 210 while sliding the display 210 in a first direction (hereinafter, +X axis direction) which is the direction in which a side surface of the electronic device 101 faces toward.

In the normal mode, the display 210 displays a screen into a region which is formed by a first housing 301 and a second housing 302 of the electronic device 101, when viewed in a second direction (hereinafter, +Z axis direction) in which a front side of the electronic device 101 faces toward. In the normal mode, the display 210 may be disposed in a bending state or a rolling state inside the first housing 301 disposed in the +X axis direction.

The display 210 of the electronic device 101 may face the +Z axis direction in which the front side of the electronic device 101 faces toward. A user may view the screen of the display 210 from the front side of the electronic device 101.

In the normal mode, a first part 310 of the display 210 may be viewed from the outside and may have a constant size in a portion viewed from the outside. The first part 310 may be defined as a fixed part, because the portion of the first part 310, which is viewed from the outside, has a constant size.

The first housing 301 may form upper and lower outer portions of the electronic device 101 and may protect the upper and lower portions of the display 210. A connector, microphone hole, speaker hole, and sensor hole may be disposed in the first housing 301.

At least a portion of a driving unit 181 may be disposed inside the first housing 301. A moving unit is disposed inside the first housing 301 to move the display 210 while sliding the display 210 in the +X axis direction, which is the direction of the side surface of the electronic device, or in an opposite direction (hereinafter, −X axis direction) to the +X axis direction. For example, a rail structure may be disposed inside the first housing 301 to slide the display 210 in the +X axis direction, which is the direction of the side surface of the electronic device, or in the −X axis direction opposite to the +X axis direction.

The first housing 301 may form one side surface of the electronic device 101. A portion of the side surface of the display 210 is rolled into the side surface of the first housing 301 such that the portion is stored in the side surface of the first housing 301. For example, the portion of the side surface of the display 210, which is disposed in the +X axis direction of the first housing 301, is rolled into the first housing 301 such that the portion of the side surface of the display 210 is stored in the side surface of the first housing 301. A rotating unit 183 may be disposed inside the side surface of the first housing 301 to move the display 210 while sliding the display 210 in the +X axis direction, which is the direction of the side surface of the display 210, or in the −X axis direction opposite to the +X axis direction. For example, a roller may be disposed in the side surface of the first housing 301 to move the display 210 in the +X axis direction or the −X axis direction opposite to the +X axis direction.

The second housing 302 may form a side surface, which is opposite to the side surface of the first housing 301 of side surfaces of the electronic device 101. The second housing 302 may protect a side surface, which protrudes in the −X axis direction opposite to the +X axis direction, of side surfaces of the display 210. The second housing 302 may move in the +X axis direction or in the X axis direction opposite to the +X axis direction, together with the display 210.

The side surfaces of the first housing 301 may be formed separately from the upper and lower portions of the first housing 301. For example, at least a portion of the side surface of the first housing 301 may be integrally coupled to the upper and lower portions of the first housing 301.

Figure 4:
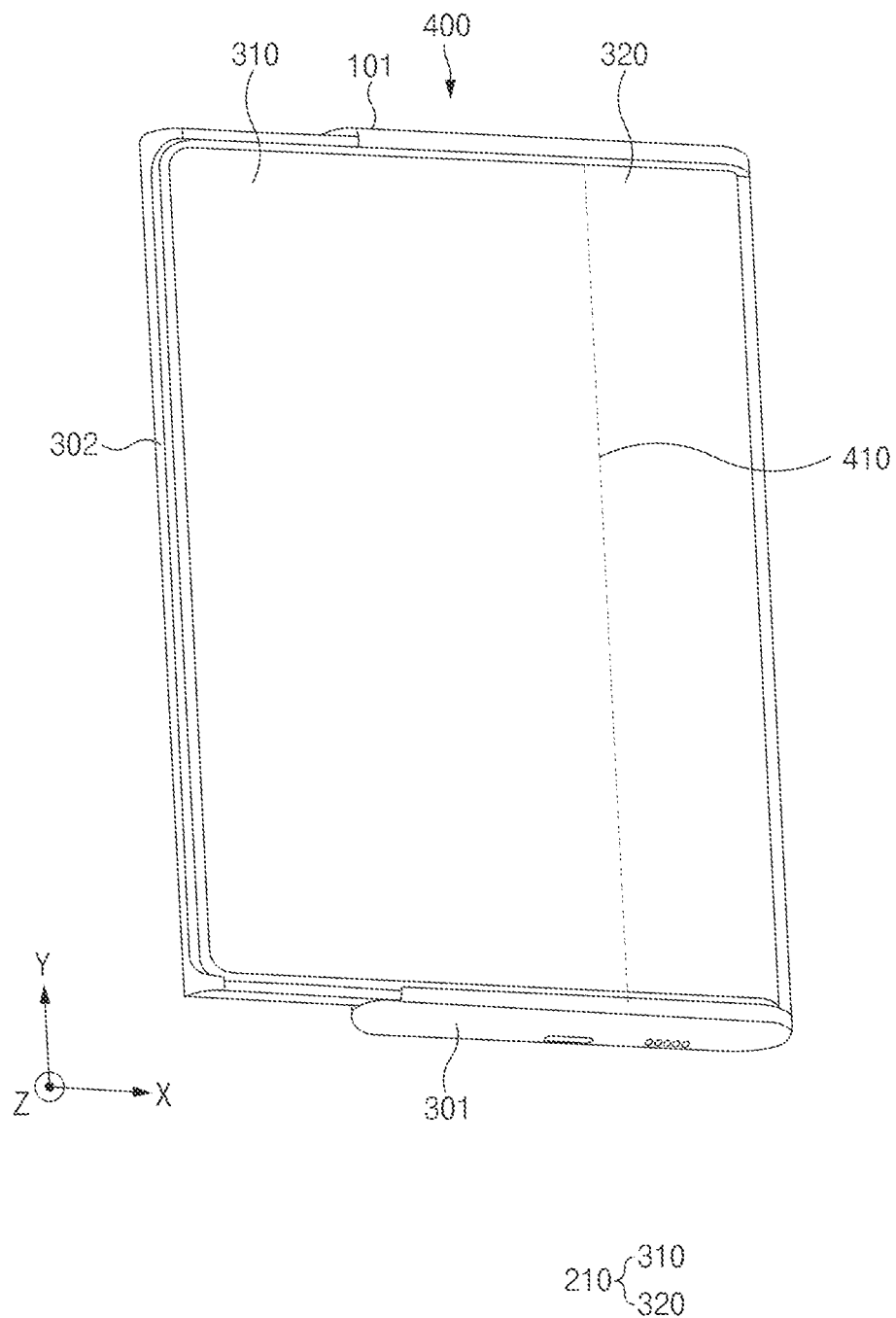
FIG. 4 is a front view illustrating an extension mode of a display of an electronic device, according to an embodiment.

FIG. 4 is a front view 400 illustrating an extension mode of the display 210 of the electronic device 101, according to an embodiment. The electronic device 101 illustrated in FIG. 4 may be formed by extending the display 210 of the slidable electronic device 101 of FIG. 3 in the X axis direction opposite to the +X axis direction.

In an extension mode, the display 210 is extended out of the electronic device 101, when viewed from the +Z axis direction which is the direction of the front side of the electronic device 101. For example, in the extension mode, the display 210 is extended further in the −X axis direction opposite to the +X axis direction than the first housing 301, when viewed from the +Z axis direction which is the direction of the front side of the electronic device 101.

The display 210 may be extended out in the −X axis direction opposite to the +X axis direction of the electronic device 101 while being unfolded or sliding inside the first housing 301.

The display 210 may include the first part 310 and a second part 320. The first part 310 has a constant size when viewed from the outside and may be defined as a fixed part. The second part 320 has a variable size when viewed from the outside and may be variably changed depending on user control. The second part 320 is extended out of the electronic device 101, and thus may be defined as an extension part.

When viewed in the +Z axis direction, the size of the display 210, which is viewed to the user, may be increased. As the display 210 folded inside the first housing 301 is unfolded or slid, the second part 320 may be visibly exposed to the outside. The size of the display 210 may be increased by the size of the second part 320 in the extension mode of the display 210, when compared to the normal mode of the display 210.

A first boundary 410 may separate the first part 310 from the second part 320 and may be a virtual line for distinguishing between the normal mode and the extension mode of the display 210.

The first housing 301 may fix the upper and lower portions of the display 210 to prevent the display 210 from being separated from the electronic device 101. The first housing 301 may protect a side surface of the display 210, which faces the +X axis direction, of side surfaces of the display 210.

The second housing 302 may protect a side surface of the display 210, which faces the −X axis direction opposite to the +X axis direction of the side surfaces of the display 210.

FIGS. 3 and 4 illustrate that the electronic device 101 is the slidable electronic device 101, according to an embodiment. However, the disclosure is not limited thereto. For example, the electronic device 101 may include the display 210 having a variable screen size, similarly to a left or right rollable electronic device 101, a vertical rollable electronic device 101, a free-stop rollable electronic device 101, a stretchable electronic device 101, and/or an electronic device 101 including a variable circular display 210.

Figure 5:
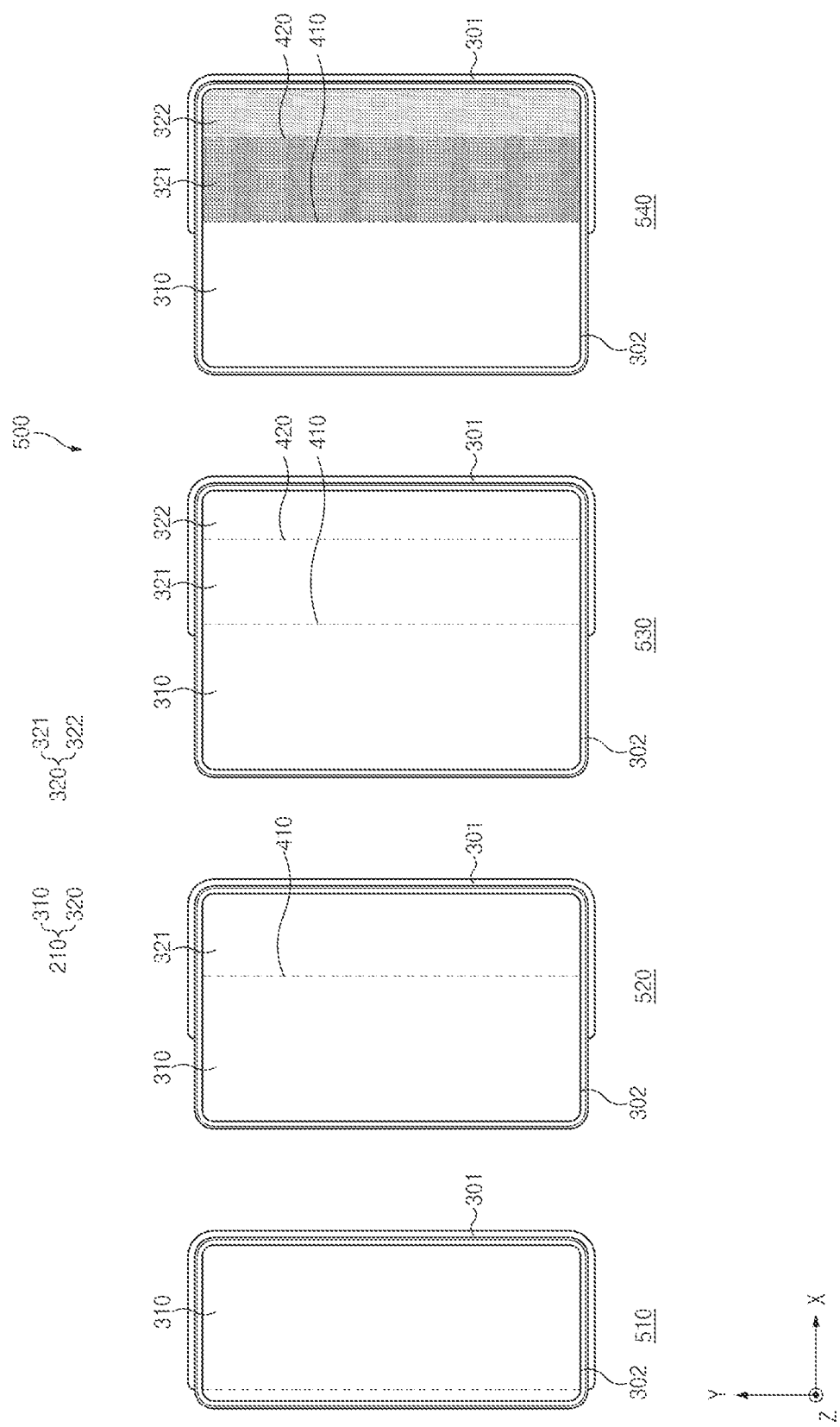
FIG. 5 illustrates when a size of a second part of a display is changed, according to an embodiment.

FIG. 5 is a view 500 illustrating when a size of the second part 320 of the display 210 is changed, according to an embodiment.

The first part 310 of the display 210 may be viewed from the outside in a first situation 510 in which the display 210 is in the normal mode. The display 210 in the first situation 510 may display a screen through the first part 310. The second part 320 of the display 210 in the first situation 510 may be disposed in a bending state or a rolling state inside the side surface of the first housing 301.

The display 210 in a second situation 520 may be viewed from the outside in the first part 310 and a first virtual region 321 of the second part 320. The processor 120 may set the first boundary 410 for separating the first part 310 from the second part 320. The first boundary 410 may be a virtual line set to control the operation of the display 210 without being viewed by a user. The first virtual region 321 of the display 210 in the second situation 520 may be viewed from the outside in the extension mode. The display 210 in the second situation 520 may display a screen through the first part 310 and the first virtual region 321.

In a third situation 530, the display 210 may be viewed from the outside in the first part 310, the first virtual region 321 of the second part 320, and a second virtual region 322 of the second part 320. The processor 120 may set a second boundary 420 for separating the first virtual region 321 of the second part 320 from the second virtual region 322 of the second part 320. The second boundary 420 may be a virtual line set to control the operation of the display 210 without being viewed by the user. The first virtual region 321 and the second virtual region 322 of the display 210 in the third situation 530 may be viewed from the outside in the extension mode. The display 210 in the third situation 530 may display a screen through the first part 310, the first virtual region 321, and the second virtual region 322.

In a fourth situation 540, as a screen is displayed on the display 210 for an extended period of time, the degradation, such as a burn-in phenomenon, of the display 210 may be caused. The first virtual region 321 and the second virtual region 322 of the second part 320 may be dynamically inserted into the electronic device 101 or may be visually exposed to the outside while the electronic device is being used. The time at which the first virtual region 321 is used may be mutually different from the time at which the second virtual region 322 is used. The degree to which the first virtual region 321 is degraded may be mutually different from the degree to which the second virtual region 322 is degraded. Accordingly, the second boundary 420 virtually set by the processor 120 to control the operation of the display 210 may be viewed to the user. The degradation of the display 210 may be compensated so that the second boundary 420 is less viewed to the user.

Figure 6:
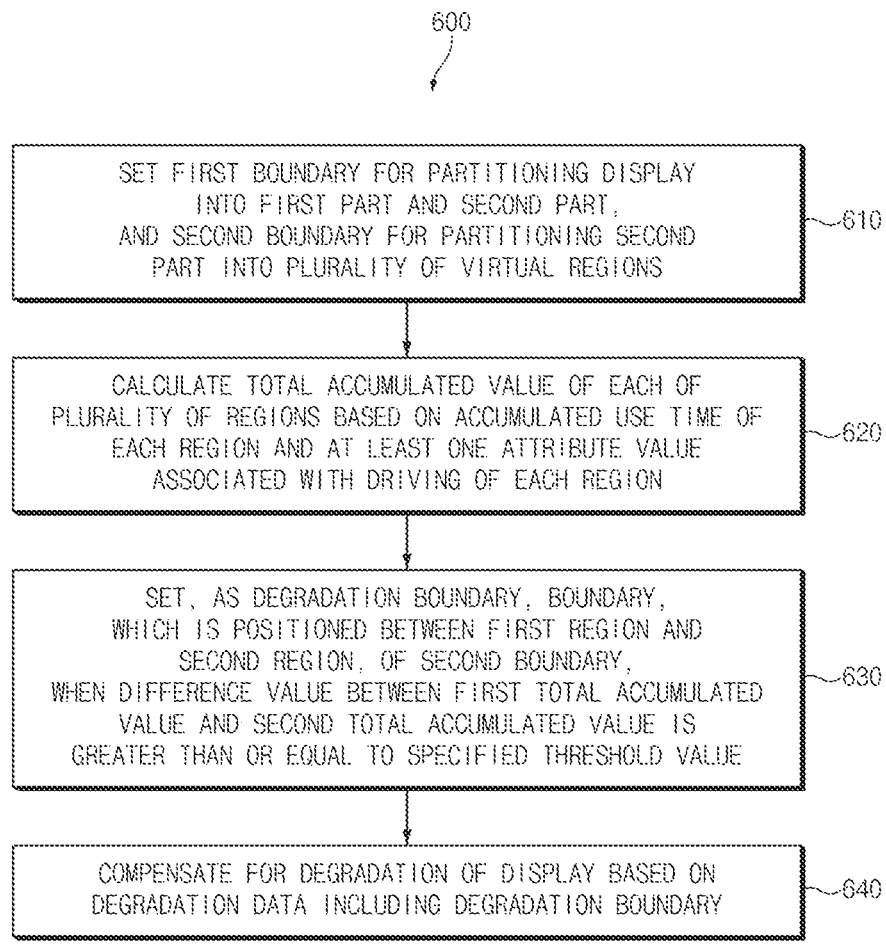
FIG. 6 illustrates a method for compensating for the degradation of a display having variable screen sizes, according to an embodiment.

FIG. 6 illustrates a method for compensating for the degradation of a display having a variable screen size, according to an embodiment.

A processor 120 of an electronic device may set a first boundary 410 for separating a first part 310 and a second part 320 of the display 210 and a second boundary 420 for partitioning the second part 320 into a plurality of virtual regions (e.g., the first virtual region 321 and the second virtual region 322 of FIG. 5) in step 610. The first boundary 410 and the second boundary 420 may be virtual lines set for the operation of the display 210. In the first part 310, a size viewed from the outside is constant. In the second part 320, a size viewed from the outside changes. The plurality of virtual regions 321 and 322 may include a first virtual region 321 and a second virtual region 322 adjacent to each other.

In step 620, the processor 120 may calculate a total accumulated value of each of the plurality of regions 321 and 322 based on an accumulated use time for each of the regions 321 and 322 and at least one attribute value associated with driving of each of the regions 321 and 322. The accumulated use time is the time for which each of the regions 321 and 322 is turned on for a set period. The processor 120 may measure time for which a screen is displayed on each of the first virtual region 321 and the second virtual region 322 for the set period. The at least one attribute value associated with driving of each of the first virtual region 321 and the second virtual region 322 may include an accumulated brightness value, an accumulated RGB value, and/or an accumulated pixel gamma value. The processor 120 may measure an accumulated brightness value, an accumulated RGB value, and/or an accumulated pixel gamma value of each of the regions 321 and 322 for the set period.

In step 630, the processor 120 of the electronic device 101 may set a boundary as a degradation boundary positioned between the first region 321 and the second region 322, of the second boundary 420, when a difference value between a first total accumulated value, which is a total accumulated value of the first region 321, and a second total accumulated value, which is a total accumulated value of the second region 322, is greater than or equal to a specified threshold value. The degradation boundary may be a virtual line set to compensate for the degradation of the display 210 with respect to each of the plurality of virtual regions 321 and 322. The processor 120 may set the virtual line between the first region 321 and the second region 322 as the virtual line for compensating for the degradation, when the difference value in total accumulated value between the first region 321 and the second region 322 is greater than or equal to the specified threshold value.

In step 640, the electronic device 101 may compensate for the degradation of the display 210, based on the degradation data including the degradation boundary. The processor 120 of the electronic device 101 may transmit the degradation data including the degradation boundary to a display driver integrated circuit (IC) 230. The display driver IC 230 may generate compensation data for compensating for the degradation of the display 210, based on the degradation data and a degradation compensating algorithm stored in the memory 130. The display driver IC 230 may compensate for the degradation of the display 210 based on the compensation data. The display driver IC 230 may update the degradation compensating algorithm, based on the degradation data.

The display driver IC 230 may perform current regulation (or compensation) with respect to the regions (e.g., the first virtual region 321, the second virtual region 322, a third virtual region 323, and/or a fourth virtual region 324 of the second part 320 of the display 210.

Figure 7:
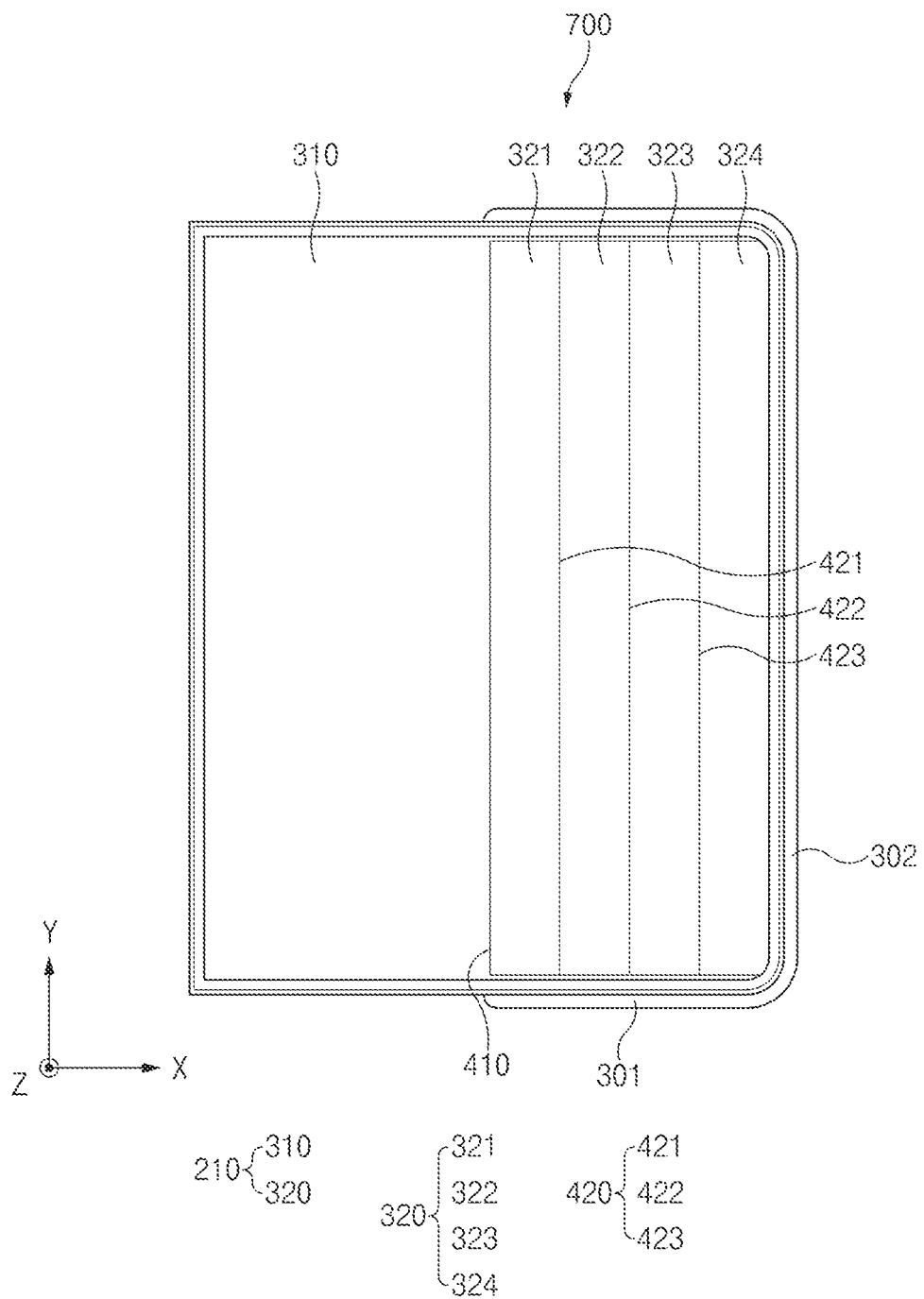
FIG. 7 illustrates setting of a second boundary for partitioning a second part of a display into a plurality of virtual regions, according to an embodiment.

FIG. 7 is a view 700 illustrating setting of the second boundary 420 for partitioning the second part 320 of a display into a plurality of virtual regions 321, 322, 323, and 324, according to an embodiment.

The second part 320 of the display 210 may include the virtual regions 321, 322, 323, and 324. For example, the second part 320 may include the first virtual region 321, the second virtual region 322, the third virtual region 323, and/or the fourth virtual region 324. The second boundary 420 may include the first sub-boundary 421, which separates the first virtual region 321 from the second virtual region 322, the second sub-boundary 422 which separates the second virtual region 322 from the third virtual region 323, and the third sub-boundary 423 which separates the third virtual region 323 from the fourth virtual region 324.

The number of the virtual regions 321, 322, 323, and 324 included in the second part 320 may be set to various values. FIG. 7 illustrates that the number of the plurality of virtual regions 321, 322, 323, and 324 is, for example, '4'. However, the disclosure is not limited thereto. The second part 320 may include two, three, five or more virtual regions.

The number of the virtual regions 321, 322, 323, and 324 may be set based on the resolution of the display 210, which may be divided by a size equal to or larger than the size of at least one pixel unit. When the number of the virtual regions 321, 322, 323, and 324 is increased, the display 210 may be sub-divided to be controlled and a resource used to control the display 210 may be increased. The processor 120 may set the number of virtual regions 321, 322, 323, and 324, based on the sub-division degree for the control of the display 210 and an amount of resources used to control the display 210.

The electronic device 101 may further include a sensor module 176 which senses a change in the size of the second part 320. The processor 120 may set the first boundary 410 and the second boundary 420 when the change in the size of the second part 320 is sensed.

The electronic device 101 may include a specified resolution mode (e.g., a first resolution mode, a second resolution mode, and/or a third resolution mode), depending on the change in the size of the second part 320. The processor 120 may set the first boundary 410 and the second boundary 420 depending on each resolution mode.

Figure 8:
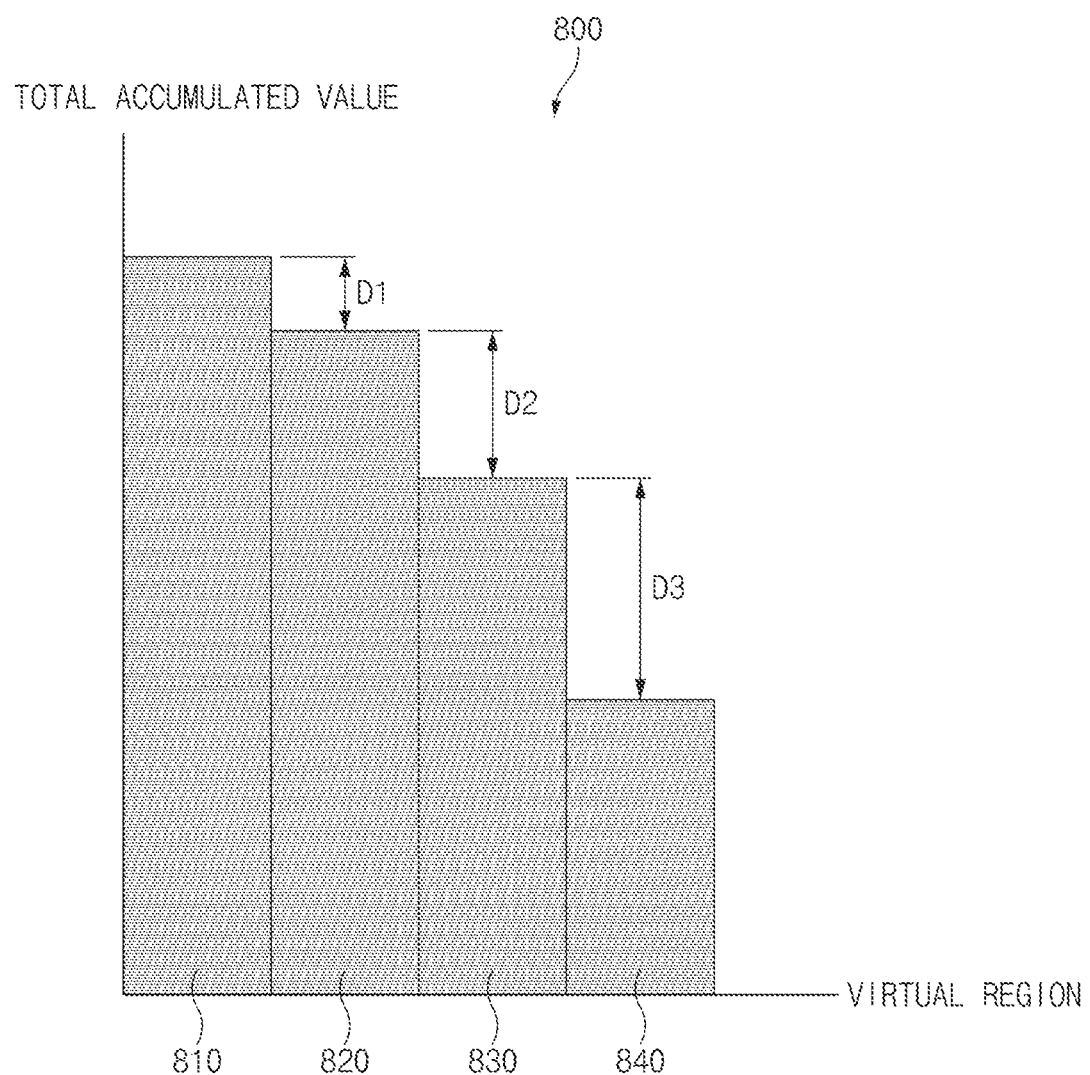
FIG. 8 illustrates a graph of total accumulated values calculated with respect to a plurality of virtual regions, according to an embodiment.

FIG. 8 is a graph 800 illustrating total accumulated values 810, 820, 830, and 840 which are calculated with respect to a plurality of virtual regions, according to an embodiment.

A processor 120 may measure an accumulated use time of each of the plurality of regions 321, 322, 323, and 324 and at least one attribute value associated with driving of each of the plurality of regions 321, 322, 323, and 324. The accumulated use time is the time for which each of the regions 321, 322, 323, and 324 is turned on for a set period. The at least one attribute value associated with driving of each of the regions 321, 322, 323, and 324 may include an accumulated brightness value, an accumulated RGB value, and/or an accumulated pixel gamma value.

The processor 120 may measure a resolution value to calculate a plurality of total accumulated values 810, 820, 830, and 840. The resolution value may be information including a position of each of regions partitioned based on resolution. The resolution value may be information transformed to a width, a height, or a set region.

The processor 120 may measure color information to calculate the plurality of total accumulated values 810, 820, 830, and 840. The color information may be obtained based on the accumulated value of RGB values applied to the electronic device 101. For example, the color information may be obtained based on a color on pixel ratio (COPR). The COPR may include accumulated color information of a frame displayed on the screen of the display 210.

The processor 120 may apply a weight to each of the accumulated use time and at least one attribute value. For example, the processor 120 may apply a first weight to the accumulated use time, apply a second weight to the accumulated brightness use, and apply a third weight to the accumulated RGB value. The processor 120 may calculate the plurality of total accumulated values 810, 820, 830, and 840, based on the accumulated use time, and the weight applied to each of the at least one attribute value. For example, the processor 120 may calculate each of the plurality of total accumulated values 810, 820, 830, and 840 by using (accumulated use time*first weight)+(accumulated brightness*second weight)+(accumulated RGB value*third weight).

The processor 120 may calculate the plurality of total accumulated values 810, 820, 830, and 840 as illustrated in the following Table 1, by measuring accumulated use times and a plurality of attribute values of the plurality of virtual regions 321, 322, 323, and 324 for the set period.

TABLE 1

| Virtual region | Accumulated use time | Accumulated brightness | Accumulated RGB value | Total accumulated value |
|---|---|---|---|---|
| First region 321 | 50 | 300 | 100 | 350 |
| Second region 322 | 45 | 280 | 90 | 330 |
| Third region 323 | 40 | 250 | 80 | 300 |
| Fourth region 324 | 30 | 200 | 60 | 240 |

The processor 120 may calculate a difference value between total accumulated values of adjacent virtual regions among the plurality of virtual regions 321, 322, 323, and 324. For example, the processor 120 may calculate a first difference value D1 between the first total accumulated value 810, which is the total accumulated value of the first region 321, and the second total accumulated value 820 which is the total accumulated value of the second region 322. The processor 120 may calculate a second difference value D2 between the second total accumulated value 820 and the third total accumulated value 830 which is the total accumulated value of the third region 323. The processor 120 may calculate a third difference value D3 between the third total accumulated value 830 and the fourth total accumulated value 840 which is the total accumulated value of the fourth region 324.

Figure 9:
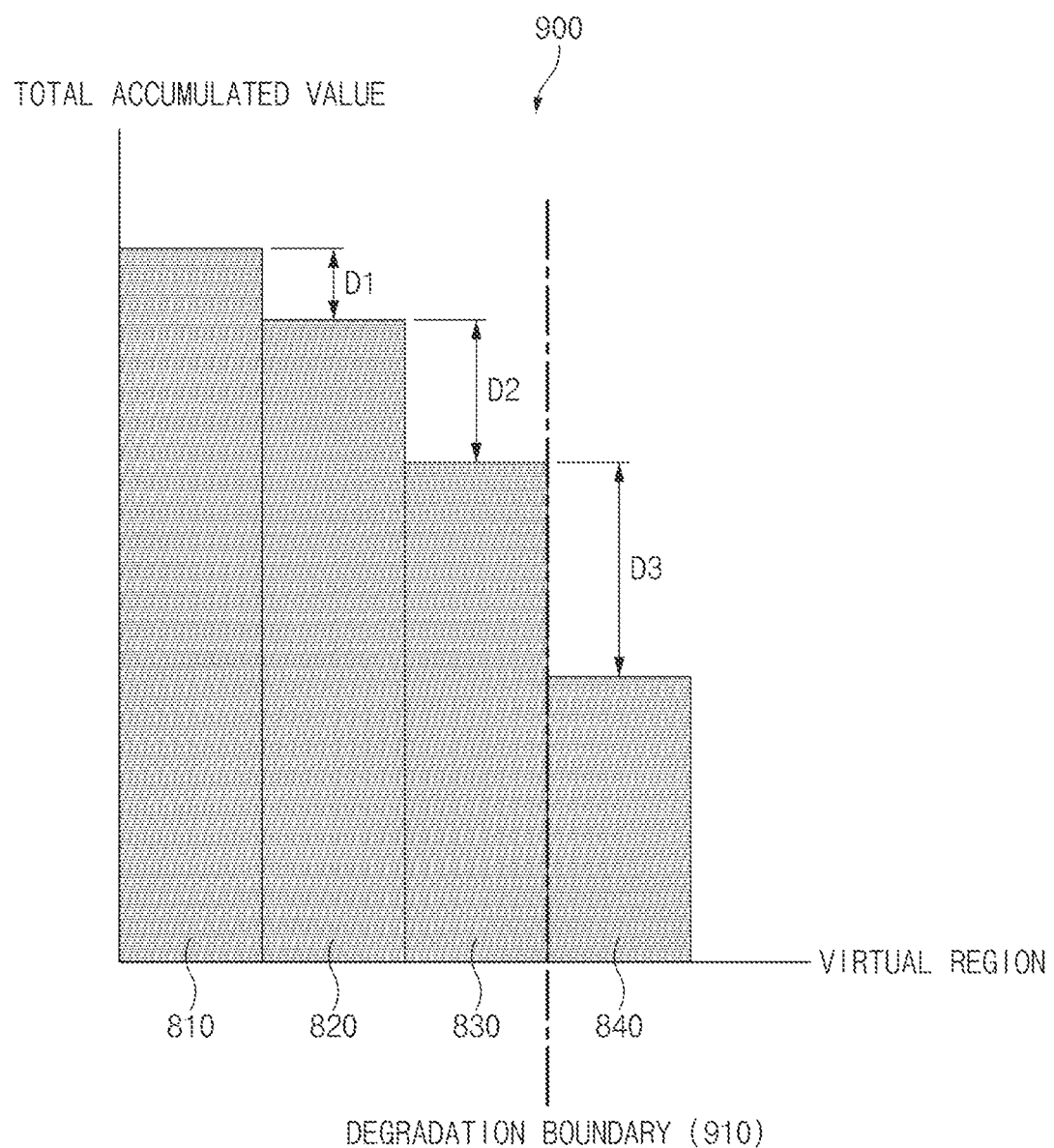
FIG. 9 illustrates setting of a degradation boundary based on total accumulated values, according to an embodiment.

FIG. 9 is a view 900 illustrating setting of a degradation boundary 910 based on total accumulated values 810, 820, 830, and 840, according to an embodiment.

The processor 120 may calculate, as '20', the first difference value D1 between the first total accumulated value 810, which is the total accumulated value of the first virtual region 321 and the second total accumulated value 820 which is the total accumulated value of the second virtual region 322. The processor 120 may calculate, as '30', the second difference value D2 between the second total accumulated value 820, and the third total accumulated value 830 which is a total accumulated value of the third virtual region 323. The processor 120 may calculate, as '60', the third difference value D3 between the third total accumulated value 830, and the fourth total accumulated value 840 which is the total accumulated value of the fourth virtual region 324.

The processor 120 may determine whether the difference value D1, D2, or D3 between two adjacent regions of the plurality of virtual regions 321, 322, 323, and 324 is greater than or equal to a specified threshold value indicating that a user starts to view a boundary between adjacent virtual regions due to the degradation of the display. For example, in FIG. 9, the threshold value may be set to about '50'.

The processor 120 may set a boundary included in the second boundary 420 and is adjacent to two regions having the difference value D3 as the degradation boundary 910 when the difference value D3 is greater than or equal to the specified threshold value. For example, when the third difference value D3, which is '60', is greater than the specified threshold value, which is 50, the processor 120 may set the boundary between the third region 323 and the fourth region 324 as the degradation boundary 910.

Figure 10:
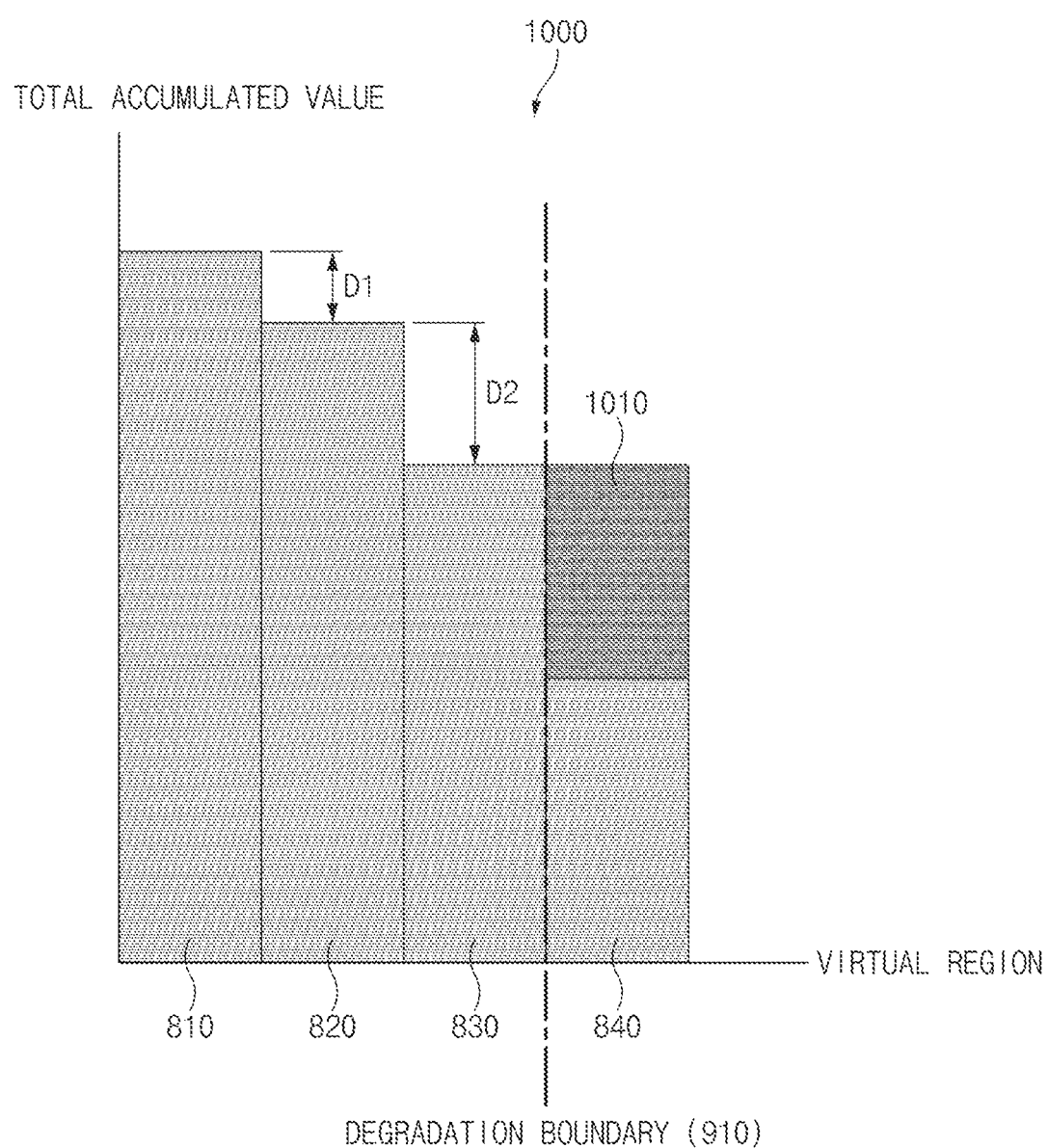
FIG. 10 illustrates degradation compensation of a display based on degradation data including a degradation boundary, according to an embodiment.

FIG. 10 is a view 1000 illustrating when degradation compensation 1010 is performed with respect to a display, based on degradation data including the degradation boundary 910, according to an embodiment.

The processor 120 may generate degradation data based on the set degradation boundary 910. The processor 120 may transmit the degradation data to a display driver IC 230 which may generate compensated data based on the degradation data.

The display driver IC 230 may perform the degradation compensation 1010 based on the compensated data and a degradation compensating algorithm stored in a memory 130. The degradation compensating algorithm may be set to increase a degradation degree of the virtual region 324 of two virtual regions 323 and 324 adjacent to the degradation boundary 910, such that the degradation degree of the virtual region 324 is equal to the degradation degree of the virtual region 323, which is higher than the degradation degree of the virtual region 324. For example, the degradation compensation 1010 based on the degradation compensating algorithm may be set to increase the total accumulated value 840 of the fourth region 324 such that the total accumulated value 840 of the fourth region 324 could become equal to the third total accumulated value 830 of the third region 323, which previously had a higher degradation degree than that of the fourth region 324.

Figure 11:
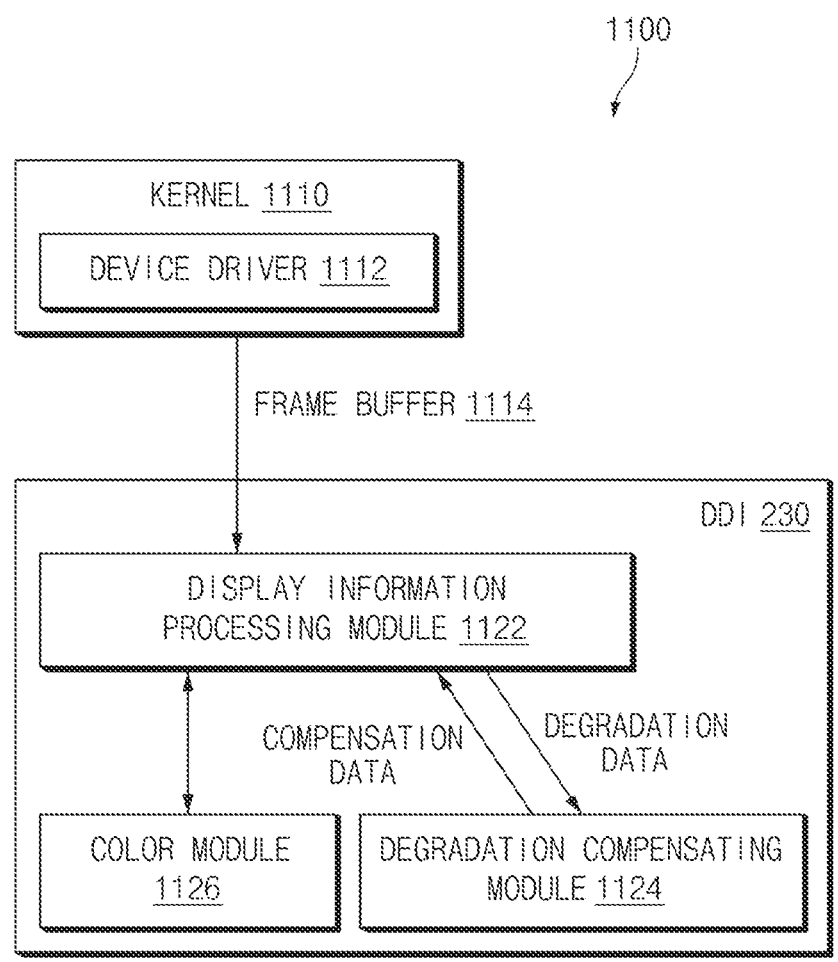
FIG. 11 illustrates components for performing degradation compensation of a display, according to a first embodiment.

FIG. 11 is a block diagram 1100 illustrating components for performing degradation compensation of a display, according to a first embodiment.

A kernel 1110 may include a device driver 1112. The device driver 1112 processes a frame buffer 1114 displayed on the screen of the display 210.

The device driver 1112 may transmit the frame buffer 1114 to a display information processing module 1122 of the display driver IC (or DDI) 230. The display information processing module 1122 may accumulate, store, and/or update information of the frame buffer 1114.

The display information processing module 1122 may recognize a degradation boundary 910 based on information of the frame buffer 1114. The display information processing module 1122 may generate degradation data based on the degradation boundary 910 included in the information of the frame buffer 1114. The display information processing module 1122 may transmit degradation data to a degradation compensating module 1124.

The degradation compensating module 1124 may generate compensation data based on the degradation data by using the degradation compensating algorithm. The degradation compensating module 1124 may include display burn-in compensation algorithm. The display burn-in compensation algorithm may perform the degradation compensation of the display 210. The display burn-in compensation algorithm may perform color correction and/or gradation of a boundary with respect to each of a plurality of virtual regions which are set. The degradation compensating module 1124 may transmit the compensation data to the display information processing module 1122.

The display information processing module 1122 may process the degradation boundary 910. The display information processing module 1122 may compensate one region between two regions adjacent to the degradation boundary 910 which has a higher degradation degree such that the degradation boundary 910 is not viewed based on the compensation data.

The display information processing module 1122 may transmit or receive data to or from a color module 1126. The color module 1126 may be a COPR IP. The COPR IP may include color information accumulated for each frame displayed on the screen. The display information processing module 1122 may perform the degradation compensation based on color information.

Figure 12:
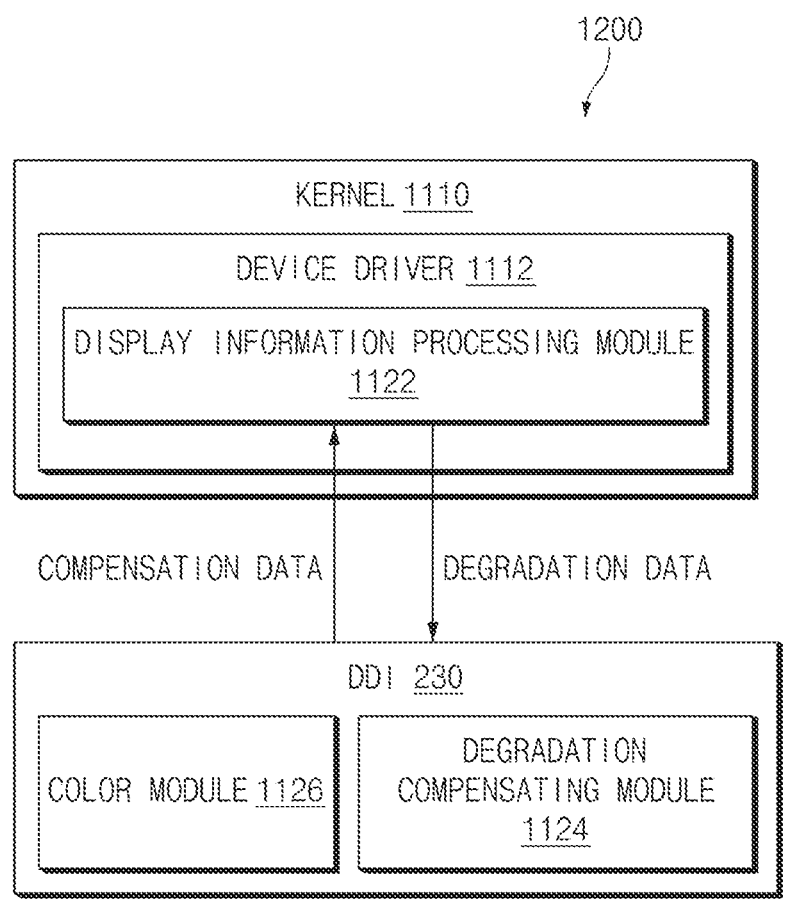
FIG. 12 illustrates components for performing degradation compensation of a display, according to a second embodiment.

FIG. 12 is a block diagram 1200 illustrating components for performing degradation compensation of a display, according to a second embodiment.

The display information processing module 1122 may be included in the device driver 1112 of the kernel 1110. In this case, the display information processing module 1122 of the kernel 1110 may transmit the degradation data to the display driver IC 230. The degradation compensating module 1124 of the display driver IC 230 may generate compensation data based on the degradation data and the degradation compensating algorithm. The display driver IC 230 may transmit the compensation data to the display information processing module 1122. The display information processing module 1122 may perform degradation compensation based on compensation data.

Figure 13:
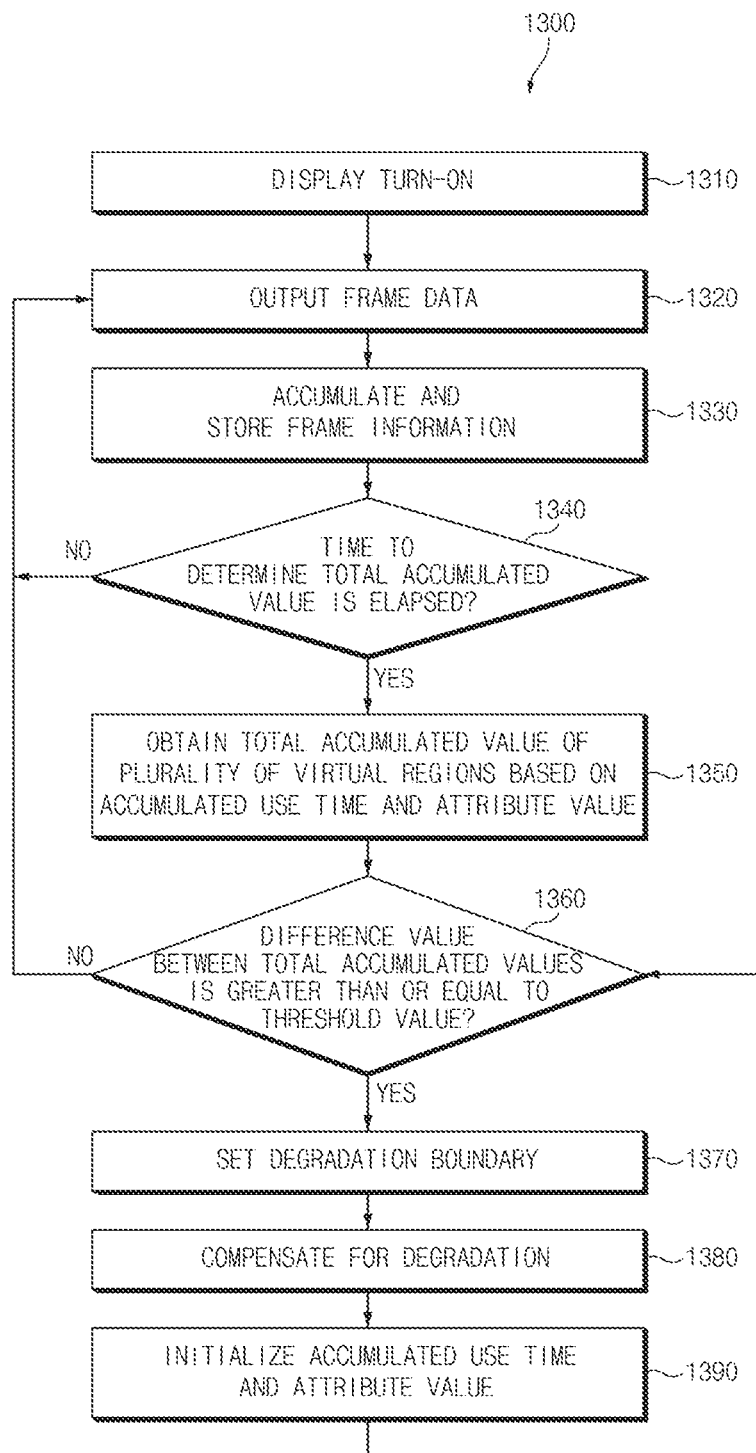
FIG. 13 illustrates a method for performing degradation compensation of a display, according to an embodiment.

FIG. 13 is a flowchart 1300 illustrating when degradation compensation of a display is performed, according to an embodiment.

An electronic device 101 may turn on the display 210 in step 1310.

The device driver 1112 of the electronic device 101 may output frame data in step 1320.

The device driver 1112 may accumulate and store frame information in step 1330.

A processor 120 of the electronic device 101 may determine whether time to determine a total accumulated value is elapsed, in step 1340. The processor 120 may determine the total accumulated value for every set period, which is a time length in which the degradation of the display 210 is caused. The set period may be set depending on the accumulated brightness of the display 210 and the screen displayed on the display 210. When the time to determine the total accumulated value is elapsed (YES in step 1340), the processor 120 may perform operation 1350. When the time to determine the total accumulated value is not elapsed (NO in step 1340), the processor 120 may return to step 1320.

The processor 120 may obtain the total accumulated value of the plurality of virtual regions based on the accumulated use time and the attribute value, in step 1350. The processor 120 may obtain the accumulated use time with respect to each of the plurality of virtual regions. The processor 120 may obtain the attribute value associated with the driving of each of the plurality of virtual regions. The attribute value may include an accumulated brightness value, an accumulated RGB value, and/or an accumulated pixel gamma value. The processor 120 may obtain the total accumulated value with respect to each of the plurality of virtual regions, by applying weights to the accumulated use time and the attribute value of each of the plurality of virtual regions and summing the accumulated use times and the attribute values.

The processor 120 may determine whether the difference value between the total accumulated values is greater than or equal to the threshold value, in step 1360. The threshold value indicates when the boundary between two adjacent virtual regions (two adjacent virtual regions among the plurality of virtual regions 321, 322, 323, and 324 of FIG. 7) has started to be viewed. The threshold value may be set depending on the brightness of the display 210 and/or the screen displayed on the display 210. The processor 120 may perform operation 1370 when the difference value between the total accumulated values is greater than or equal to the threshold value (YES in step 1360). The processor 120 may return to operation 1320 when the difference value between the total accumulated values is less than the threshold value (NO in step 1360).

The processor 120 may set the degradation boundary 910 in step 1370. The degradation boundary 910 may be a virtual boundary set to perform the degradation compensating algorithm. Mutually different degradation compensation degrees may be applied to virtual regions partitioned through the degradation boundary 910. The processor 120 may transmit degradation data, which includes the degradation boundary, to a display driver IC (e.g., the display IC 230.

The display driver IC 230 may perform the degradation compensation 1010 in step 1380. The display driver IC 230 may generate compensation data based on the degradation data and the degradation compensating algorithm. The display driver IC 230 may compensate for the degradation of the display 210 based on the compensation data. The display driver IC 230 may perform the degradation compensation such that the degradation boundary 910 is not viewed and the total accumulated values of two virtual regions adjacent to the degradation boundary 910 become identical to each other. The display driver IC 230 may increase a degradation degree of one region of two virtual regions adjacent to each other, such that the degradation degree of the region corresponds to a degradation degree of the remaining region, which is higher than the degradation degree of the region. The display driver IC 230 may update the degradation compensating algorithm, based on the compensated data.

The display driver IC 230 may perform current regulation (or current compensation) to increase a degradation degree of one region of two virtual regions adjacent to each other based on degradation data, such that the degradation degree of the region corresponds to a degradation degree of a remaining region of the two virtual regions, which is higher than the degradation degree of the region.

The processor 120 may initialize the accumulated use time and the attribute value in step 1390. The processor 120 may receive a signal indicating that the degradation of the display 210 is compensated, from the display driver IC 230. The processor 120 may initialize the accumulated use times and the attribute values of virtual regions adjacent to the degradation boundary 910 after compensating for the degradation of the display 210.

The virtual regions adjacent to the degradation boundary may have the same accumulated use time and the same attribute value, after the degradation of the display 210 is compensated. The processor 120 may determine the degradation boundary 910, which is previously set, as being removed, after the degradation of the display 210 is compensated. The processor 120 may not determine the difference between adjacent virtual regions as being made due to the degradation, after the degradation of the display 210 is compensated, and may initialize the accumulated use time and the attribute value for determining the difference resulting from the degradation.

The processor 120 may return to step 1360 after performing step 1390. The processor 120 may start to repeatedly obtain the total accumulated value of each virtual region. The processor 120 may newly set a part, from the plurality of virtual areas, where the difference of the total accumulated value is greater than or equal to the threshold value. The processor 120 may set among the second boundary 420 a new part different from a previous degradation boundary 910 as a new degradation boundary. The processor 120 may consecutively determine whether the difference value between the total accumulated values is greater than or equal to the threshold value, while the display 210 is turned on, and may set, as the degradation boundary, a part indicating the threshold value or more.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display including a first part where a size viewed from an outside is constant and a second part where an area viewed from the outside is variable;
   a display driver integrated circuit (IC) configured to control the display;
   a memory; and
   a processor operatively connected with the display driver IC and the memory,
   wherein the processor is configured to:
      based on the area of the second part viewed from the outside, define a plurality of virtual regions including a first region and a second region adjacent to each other,
      based on an accumulated value of red, green, blue (RGB) values applied to each frame displayed on a screen, acquire color information of each of the plurality of virtual regions,
      based on an accumulated use time for each of the plurality of virtual regions and the color information, calculate a plurality of total accumulated values of each of the plurality of virtual regions,
      set a boundary, which is positioned between the first region and the second region, as a degradation boundary, when a difference value between a first total accumulated value of the first region and a second total accumulated value of the second region is greater than or equal to a threshold value, and
      transmit degradation data including the degradation boundary to the display driver IC.

2. The electronic device of claim 1, wherein the processor is further configured to:
   apply weight to each of the accumulated use time for each of the plurality of virtual region and the color information, and
   calculate the plurality of total accumulated values by adding the weight applied accumulated use time and the weight applied color information.

3. The electronic device of claim 1, wherein the display driver IC is configured to:
   generate compensation data, which is used for compensating for degradation of the display, based on the degradation data, and
   compensate for the degradation of the display, based on the compensation data.

4. The electronic device of claim 1, further comprising:
a sensor configured to sense a change of the area of the second part,
wherein the processor is further configured to define the plurality of virtual regions in response to detecting the change of the area of the second part.

5. The electronic device of claim 1,
wherein the color information is acquired based on an RGB raw value and/or a color on pixel ratio (COPR).

6. The electronic device of claim 1, wherein the processor is further configured to:
calculate the first total accumulated value and the second total accumulated value, and
wherein the display driver IC is configured to compensate at least one of the first total accumulated value and the second total accumulated value so that the first total accumulated value and the second total accumulated value are equal.

7. The electronic device of claim 1, wherein the processor is further configured to increase a degradation degree of one of the first region and the second region so that the degradation degree of the first region and the second region is equal to a degradation degree of a region with a high degradation degree between the first region and the second region.

8. The electronic device of claim 1,
wherein the display driver IC is further configured to update a degradation compensating algorithm stored in the memory based on the degradation data.

9. The electronic device of claim 1,
wherein the processor is further configured to initialize the color information of the first region and the color information the second region after compensating for the degradation of the display.

10. A method for compensating for degradation of a display of an electronic device, the display including a first part where a size viewed from an outside is constant and a second part where an area viewed from the outside is variable, the method comprising:
based on the area of the second part viewed from the outside, defining a plurality of virtual regions including a first region and a second region adjacent to each other;
based on an accumulated value of red, green, blue (RGB) values applied to each frame displayed on a screen, acquiring color information of each of the plurality of virtual regions;
based on an accumulated use time for each of the plurality of virtual regions and the color information, calculating a plurality of total accumulated values of each of the plurality of virtual regions;
setting, as a degradation boundary, a boundary, which is positioned between the first region and the second region, when a difference value between a first total accumulated value of the first region and a second total accumulated value of the second region is greater than or equal to a threshold value; and
compensating for the degradation of the display based on degradation data including the degradation boundary.

11. The method of claim 10, wherein calculating the plurality of total accumulated values comprises:
applying weight to each of the accumulated use time for each of the plurality of virtual region and the color information; and
calculating the plurality of total accumulated values by adding the weight applied accumulated use time and the weight applied color information.

12. The method of claim 10,
wherein defining the plurality of virtual regions is performed in response to detecting a change of the area of the second part.

13. The method of claim 10,
wherein the color information is acquired based on an RGB raw value and/or a color on pixel ratio (COPR).

14. The method of claim 10, further comprising:
calculating the first total accumulated value and the second total accumulated value; and
compensating at least one of the first total accumulated value and the second total accumulated value so that the first total accumulated value and the second total accumulated value are equal.

15. The method of claim 10, wherein compensating for the degradation of the display is set to increase a degradation degree of one of the first region and the second region so that the degradation degree of the first region and the second region are equal to a degradation degree of a region with a high degradation degree between the first region and the second region.

16. The method of claim 10, further comprising:
updating a degradation compensating algorithm stored in a memory of the electronic device based on the degradation data.

17. The method of claim 10, further comprising:
initializing the color information of the first region and the color information of the second region after compensating for the degradation of the display.

18. An electronic device comprising:
a display including a first part where a size viewed from an outside is constant and a second part where an area viewed from the outside is variable;
a sensor configured to detect a change of the area of the second part;
a display driver integrated circuit (IC) configured to control the display;
a memory; and
a processor operatively connected with the display driver IC and the memory,
wherein the processor is configured to:
divide the second part into a plurality of virtual regions, when the sensor detects the change of the area of the second part,
based on an accumulated value of red, green, blue (RGB) values applied to each frame displayed on a screen, acquire color information of each of the plurality of virtual regions,
based on an accumulated use time for each of the plurality of regions and the color information, calculate a plurality of total accumulated values of each of the plurality of virtual regions,
set, as a degradation boundary, a boundary between two adjacent regions of the plurality of virtual regions, when a difference value between total accumulated values of the two adjacent regions is greater than or equal to a threshold value, and
transmit degradation data, which includes the degradation boundary, to a display information processing module of a kernel connected with the display driver IC.

19. The electronic device of claim 18, wherein the display information processing module is configured to:
generate compensation data, which is used for compensating for the degradation of the display, based on the degradation data, and
transmit the compensation data to the display driver IC.

20. The electronic device of claim 18, wherein the display information processing module is configured to compensate total accumulated values of each of the two adjacent regions to be equal to each other.

* * * * *